L. JONES.
Clod Crusher.
No. 85,010. Patented Dec. 15, 1868.
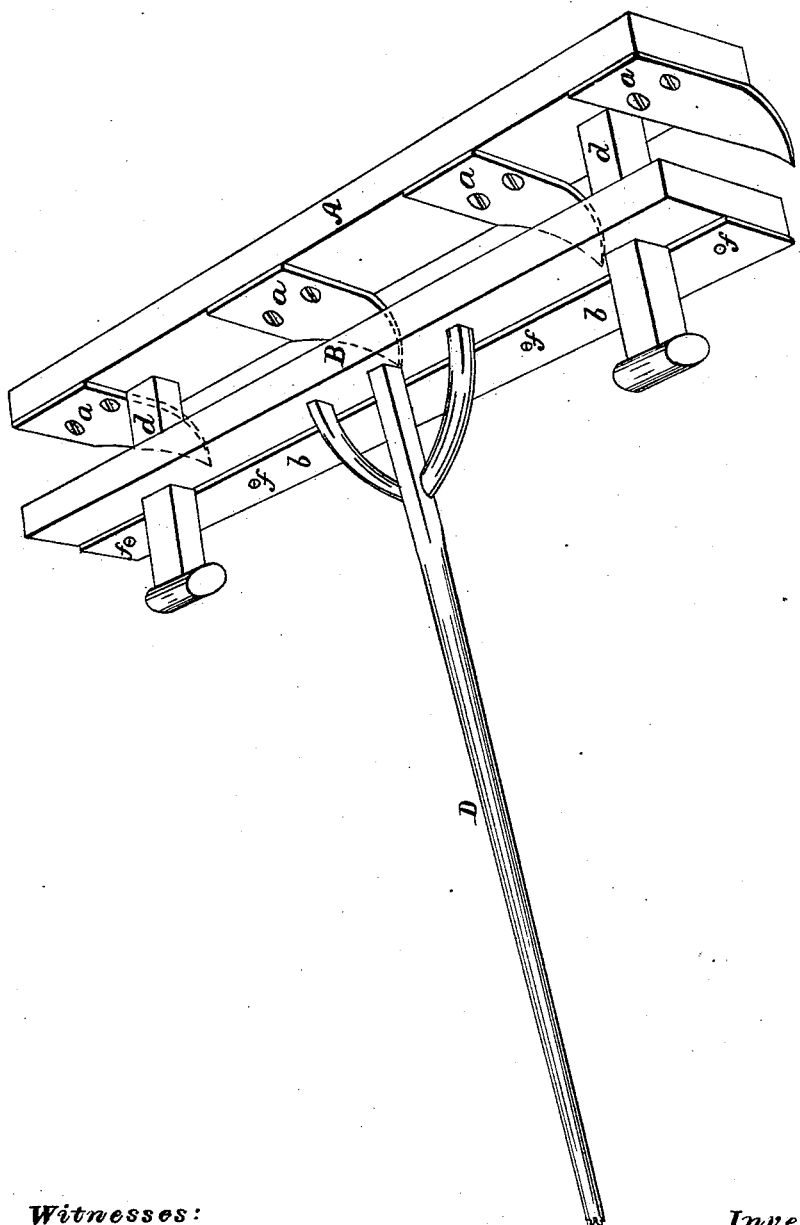
Witnesses:
Geo. C. Rothwell
Phil. F. Larner
Inventor:
Lewis Jones
By Wiederscheide
Attorneys.

LEWIS JONES, OF FUNK'S GROVE, ILLINOIS.

Letters Patent No. 85,010, dated December 15, 1868.

IMPROVEMENT IN PULVERIZER, LEVELLER, AND MARKER.

The Schedule referred to in these Letters Patent and making part of the same.

*To all whom it may concern:*

Be it known that I, LEWIS JONES, of Funk's Grove, in the county of McLean, and State of Illinois, have invented a new and improved Pulverizer, Leveller, and Marker for preparing ground preparatory to planting; and I do hereby declare the following to be a full, clear, and exact description thereof, sufficient to enable those skilled in the art to which my invention appertains, to fully understand and use the same, reference being had to the accompanying drawing, forming part of this specification, and in which my invention is represented by a perspective view of my improved implement.

My invention is a new and useful simple implement for pulverizing, levelling, and marking plowed ground, preparatory to planting corn; and It consists in the construction and arrangement of parts, as hereinafter described.

Similar letters of reference indicate corresponding parts in the several figures of the drawing.

In the drawings—

A B represent two parallel beams, connected together by cross-bars d, fitted in or through mortises in the said beams A B.

To the front beam B, and extending the entire length of the same, a plate, b, is secured, by means of screws f, or in any other suitable manner, so that it projects slightly below the beam to which it is attached.

To the rear beam A, teeth or shovels a are secured, at such distances apart as may be found best.

D represents the tongue, removably fitted in mortises c, in the front beam B.

When it is desired to use only one horse, the tongue is detached, and shafts may be hung to the projecting parts of the connections d.

The operation is as follows:

In passing over the plowed land, the teeth a sink only a short distance into the ground; therefore, as the machine is drawn along, the clods are broken by contact with the plate b, and levelled by the lower edge of the same, as it passes over. The teeth a also assist in this pulverizing of the soil, to render it more perfect, but their particular office is to mark the rows in which the corn is to be afterwards planted.

Constructed as above described, a very efficient, durable, simple, and consequently inexpensive implement is produced, whereby the labor of preparing ground for planting is greatly facilitated, so that the corn may be planted much earlier than usual, and will therefore be perfected before frost.

Having thus described my invention,

What I claim as new, and desire to secure by Letters Patent, is—

1. The combination of the parallel beams A B, provided respectively with shovel-teeth a and metallic plate b, and connected together by bars d, all constructed, arranged, and operating substantially as herein described.

2. The combined pulverizer, leveller, and marker, as herein described.

LEWIS JONES.

Witnesses:
J. M. LONGSTRETH,
WM. FULTON, Jr.